(12) United States Patent
Johnson et al.

(10) Patent No.: US 6,543,796 B1
(45) Date of Patent: Apr. 8, 2003

(54) COMBINED DESK AND LUGGAGE CARRIER

(76) Inventors: Kenneth R. Johnson, 5207 Lincolnshire Ct., Dallas, TX (US) 75287; Melissa A. Johnson, 5207 Lincolnshire Ct., Dallas, TX (US) 75287

(*) Notice: Subject to any disclaimer, the term of this patent is extended or adjusted under 35 U.S.C. 154(b) by 0 days.

(21) Appl. No.: 09/715,254

(22) Filed: Nov. 16, 2000

Related U.S. Application Data
(60) Provisional application No. 60/166,576, filed on Nov. 19, 1999.

(51) Int. Cl.$^7$ .............................. B62B 1/00; A45F 3/00
(52) U.S. Cl. ..................... 280/47.18; 280/30; 280/37; 190/11
(58) Field of Search ............... 280/47.18, 47.27, 280/47.24, 47.29, 655, 30, 37; 190/11, 12 A, 18 A; D32/24; D6/429; D3/313

(56) References Cited

U.S. PATENT DOCUMENTS

| | | | |
|---|---|---|---|
| D142,262 S | | 8/1945 | Paden |
| 2,604,959 A | | 7/1952 | Arbib |
| 2,784,004 A | * | 3/1957 | Hamrick, Jr. ................ 280/30 |
| 3,557,916 A | | 1/1971 | Stowell |
| 4,595,086 A | | 6/1986 | Simpson |
| 4,618,035 A | * | 10/1986 | Mao .......................... 280/37 |
| 4,886,233 A | * | 12/1989 | Bateman et al. ............ 280/655 |
| 5,161,811 A | * | 11/1992 | Cheng ........................ 280/30 |
| 5,306,027 A | * | 4/1994 | Cheng ........................ 280/30 |
| 5,374,073 A | * | 12/1994 | Hsin .......................... 280/30 |
| 5,437,367 A | | 8/1995 | Martin |
| 5,505,471 A | * | 4/1996 | Cheng ........................ 280/30 |
| 5,507,508 A | * | 4/1996 | Liang ...................... 280/47.18 |
| 5,529,322 A | * | 6/1996 | Barton ........................ 280/30 |
| 5,547,205 A | * | 8/1996 | Cabedo ....................... 280/30 |
| 5,941,352 A | | 8/1999 | Lee |
| 5,961,134 A | * | 10/1999 | Congleton et al. ......... 280/47.18 |
| 6,053,587 A | * | 4/2000 | Boerder ................... 280/47.18 |
| 6,196,560 B1 | * | 3/2001 | Ohlsson ...................... 280/30 |

FOREIGN PATENT DOCUMENTS

| | | | | |
|---|---|---|---|---|
| DE | 4323751 | * | 7/1993 | .................. 280/30 |

* cited by examiner

Primary Examiner—Brian L. Johnson
Assistant Examiner—Hau Phan
(74) Attorney, Agent, or Firm—Jenkens & Gilchrist A Professional Corporation

(57) ABSTRACT

A combined desk and luggage carrier for transporting luggage and for serving as a work desk which includes a generally rectangular open work frame generally vertically orientable in normal use position, having wheels at its lower end with the upper end of said frame being upwardly telescopical to provide handle means for manually moving said frame on its wheels. The carrier has a luggage support shelf pivotally connected to one side of said frame near its lower end which pivots outwardly and downwardly away from said frame to a generally horizontal position for supporting luggage placed thereon and a desk-top shelf pivotally connected to the side of the frame opposite said one side near its top end and adapted to pivot outwardly and upwardly to a generally horizontal position to provide a support surface for supporting a lap top computer. A supplemental support device such as folding telescopical legs are attached to said desk-top shelf for providing additional support thereto in said horizontal position.

8 Claims, 4 Drawing Sheets

COMBINED DESK AND LUGGAGE CARRIER

CROSS REFERENCE TO RELATED APPLICATION

This application claims priority from U.S. provisional application Ser. No. 60/166,576, filed Nov. 19, 1999, now pending.

This invention relates to equipment for assisting travelers in transporting hand luggage such as lap top computers, briefcases and overnight bags, which equipment is also provided with the capability of serving as a sturdy desk providing a work surface and accommodating, if desired, a lap top computer, portable typewriter or the like.

BACKGROUND OF THE INVENTION

Lap top computers and similar devices have been developed, inter alia, to enable business travelers to perform other work tasks while traveling. Despite their convenience, they are not truly comfortable to use on one's lap. In an airplane, this discomfort may be alleviated by the use of the folding tray tables with which aircraft seats are equipped. But in airport waiting rooms and hotel lobbies, where travelers necessarily spend a lot of time, there are no good work surfaces where lap top computers may be placed and used.

SUMMARY OF THE INVENTION

In accordance with the present invention, an improved combination unit is provided which is adapted for transporting hand luggage and for serving as a work desk sturdy enough to support a lap top computer. The unit includes a vertical generally rectangular open-work frame preferably provided with a telescoping handle or handle portion at the top thereof and wheels to provide mobility at the bottom thereof. On one side of the vertical frame at the bottom a luggage support shelf is connected by hinge means to fold outwardly and downwardly away from the frame to provide support for luggage items placed thereon. The luggage support shelf is preferably provided with folding support legs at its outer end. The luggage support shelf may be folded inwardly against the vertical frame for compact storage.

In further accordance with the invention, a desk-top shelf is connected by hinge means to the side of the vertical frame opposite the side on which the luggage support rack is mounted. The desk-top shelf is preferably hinged to the frame at or near its top to swing outwardly and upwardly to a horizontal position substantially even with the top of the vertical frame. Folding and telescoping legs are provided at the outer edge of the desk-top which are designed to be swung downwardly from the horizontally positioned desk-top and telescoped downwardly to reach the floor and thus support the desk top.

DETAILED DESCRIPTION OF THE INVENTION

Figure 1:
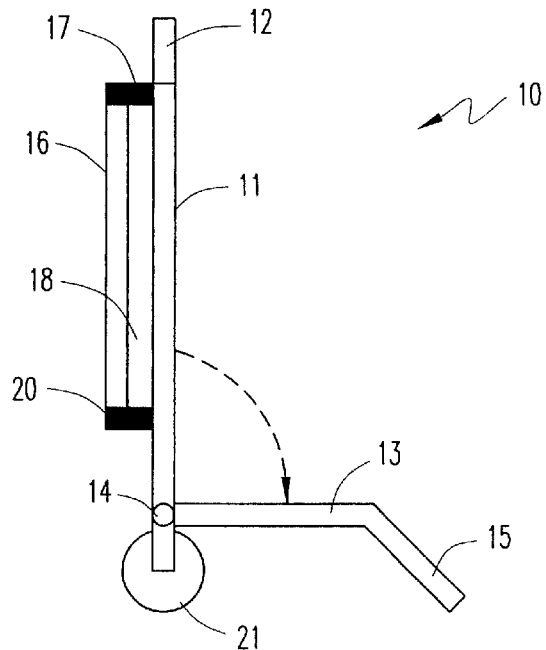
FIG. 1 shows the unit of the invention in side elevation configured as a luggage cart.

The improved combination unit 10 of the invention is adapted for transporting hand luggage and for serving as a work desk sturdy enough to support a lap top computer. The unit includes a vertical generally rectangular open-work frame 11 preferably provided with a telescoping handle 12 at the top thereof and wheels 21 to provide mobility at the bottom thereof. Handle 12 may be separate from frame 11 or preferably integral with it, as by being telescopical into it. On one side of the vertical frame 11 at the bottom a luggage support shelf 13 is connected by hinge means 14 to fold outwardly and downwardly away from the frame 11 to provide support for luggage items placed thereon. The luggage support shelf 13 is preferably provided with folding support legs 15 at its outer end. The luggage support 13 shelf may be folded inwardly against the vertical frame 11 for compact storage.

Figure 2:
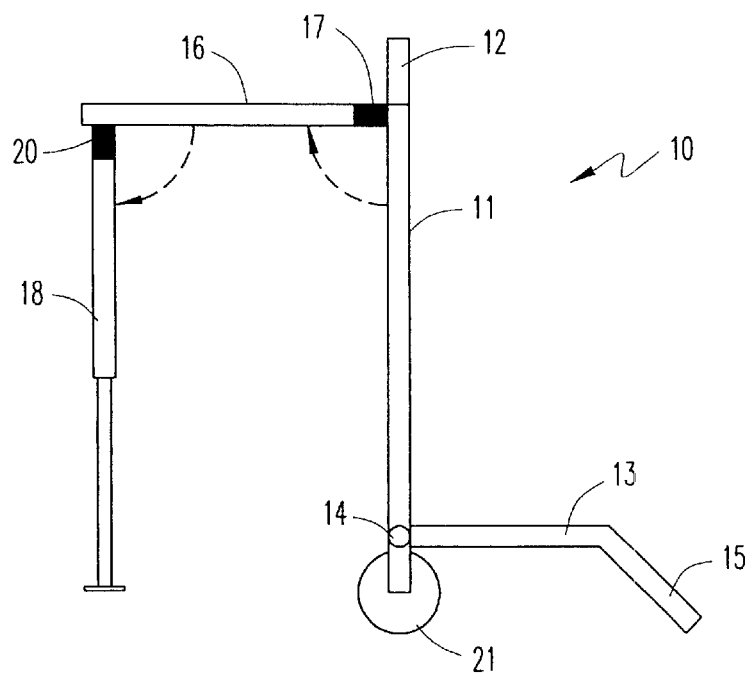
FIG. 2 shows the unit of the invention in side elevation configured as a computer desk.
Figure 3:
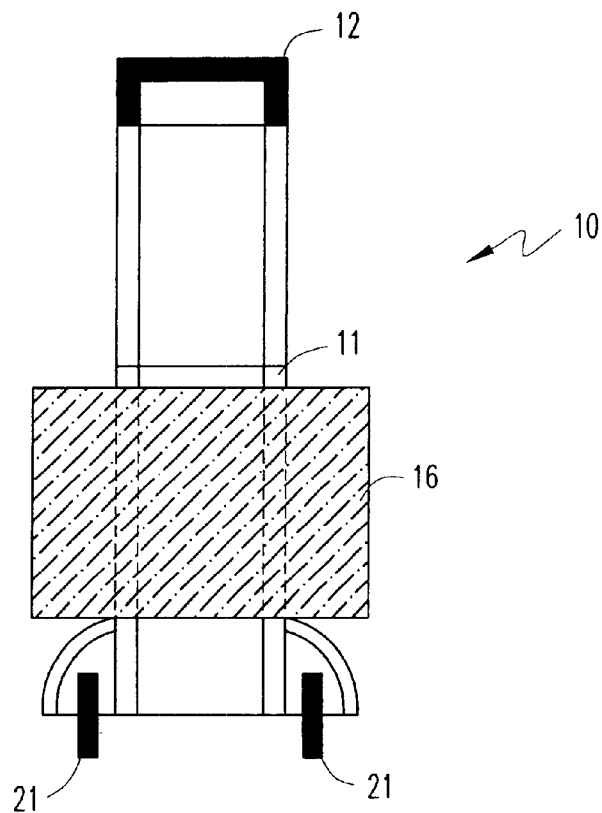
FIG. 3 is a front elevational view of the invention with the desk-top stowed and the top handle extended.
Figure 4:
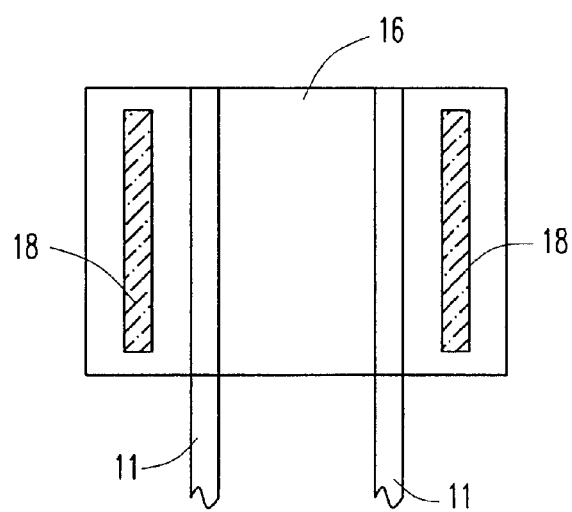
FIG. 4 is a fragmentary elevational view showing the underside of the desk-top.
Figure 5:
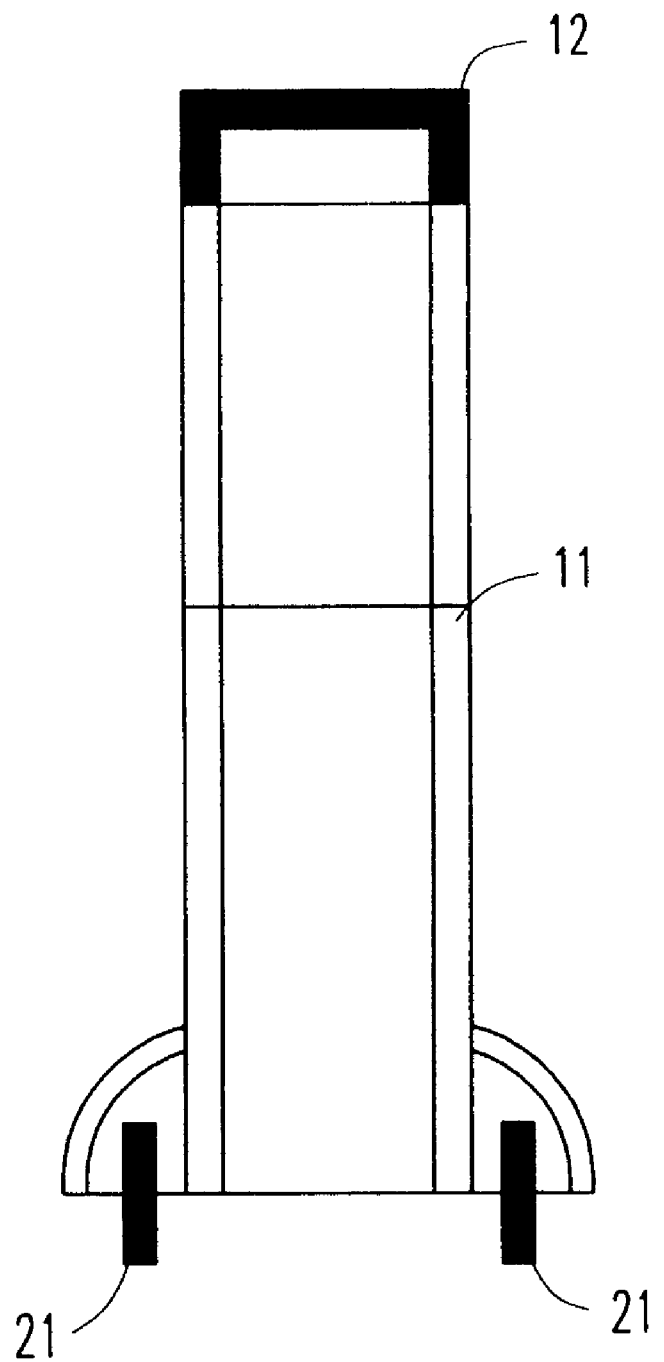
FIG. 5 is a fragmentary elevational view of the vertical frame of the unit.
Figure 6:
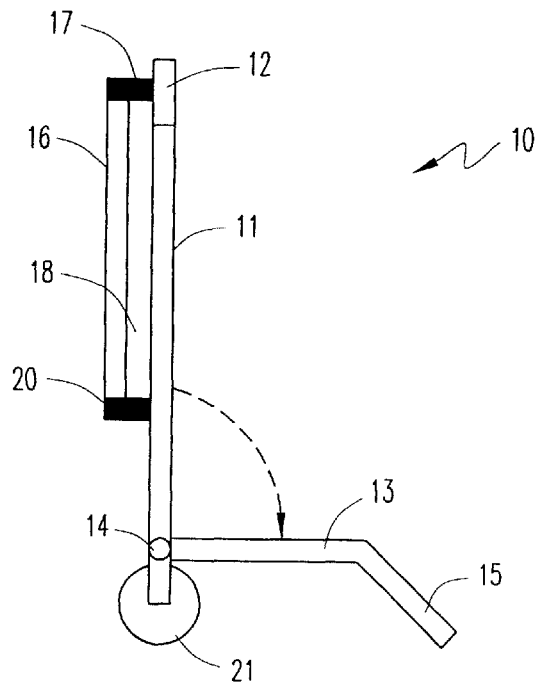
FIG. 6 is a side elevational view similar to FIG. 1 showing another preferred embodiment.
Figure 7:
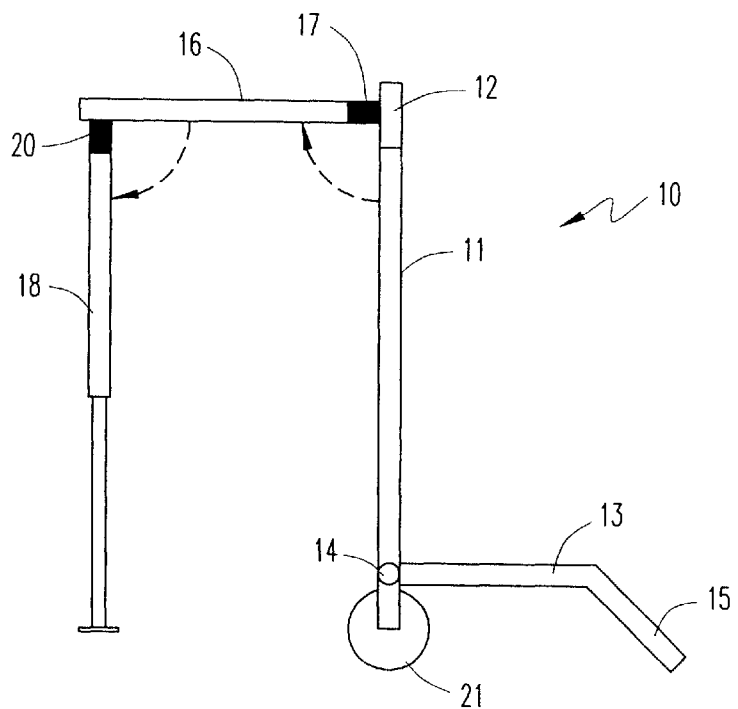
FIG. 7 is a side elevational view similar to FIG. 2 showing the embodiment of FIG. 6 configured as a computer desk.

A desk-top shelf 16 is connected by hinge means 17 to the side of the vertical frame 11 opposite the side on which the luggage support rack is mounted. As can be seen from FIG. 3, desk-top shelf 16 is generally rectangular in shape and is hinged or pivotally connected to the frame adjacent one of the edges of the shelf. The desk-top shelf is preferably hinged to the frame at or near its top to swing outwardly and upwardly to a horizontal position substantially even with the top of the vertical frame. The desk-top shelf may be hinged to the fixed uprights of the frame as shown in FIGS. 1 and 2, or preferably to the portion of the frame which is upwardly telescopical as shown in FIGS. 6 and 7. The latter arrangement provides adjustability of height to the shelf. Folding and telescoping legs 18 are provided at the outer edge of the desk-top 16 which are hinged to it by hinges 20 to be swung downwardly from the horizontally positioned desk-top 16 and telescoped downwardly to reach the floor and thus support the desk-top shelf 16, even when a lap top computer is placed on it and downward forces are exerted on it in the course of use. As can be seen from FIG. 4, it is preferred that two such legs are provided.

We claim:

1. A combined desk and luggage carrier adapted for transporting luggage and for serving as a work desk comprising:

a generally rectangular open work frame generally vertically orientable in normal use position, said frame having wheels at a lower end of said frame, the upper end of said frame being upwardly telescopical to provide handle means for manually moving said frame on the wheels of said frame;

a luggage support shelf pivotally connected to one side of said frame near the lower end thereof and adapted to pivot outwardly and downwardly away from said frame to a generally horizontal position for supporting luggage placed thereon;

a desk-top shelf pivotally connected to the side of said frame opposite said one side thereof near a top end of said frame and adapted to pivot outwardly and upwardly to a generally horizontal position to provide a support surface for supporting a lap top computer; and supplemental support means attached to outer edge of said desk-top shelf for providing additional support thereto in said horizontal position.

2. Apparatus in accordance with claim 1 in which said supplemental support means attached to said desk-top shelf comprises at least one support leg pivotally connected to said shelf and adapted to be swung downwardly therefrom when said shelf is in said generally horizontal position.

3. Apparatus in accordance with claim 2 in which said at least one support leg is adapted to telescope in length.

4. Apparatus in accordance with claim 2 in which said desk-top shelf is generally rectangular and is pivotally connected to said frame adjacent one edge of said shelf.

5. Apparatus in accordance with claim 4 in which said at least one support leg is pivotally connected to said shelf adjacent the edge of said shelf remote from said frame when said shelf is in a generally horizontal position.

6. Apparatus in accordance with claim 5 in which said supplemental support means comprises two support legs pivotally connected to said shelf adjacent the corners thereof which are remote from said frame when said shelf is in a generally horizontal position.

7. Apparatus in accordance with claim 1 wherein said desk-top shelf is pivotally connected to the portion of said frame which is upwardly telescopical.

8. Apparatus in accordance with claim 1 in which said luggage support shelf is provided with folding support legs at an outer end of said luggage support shelf.

* * * * *